(12) United States Patent
Krauleidis

(10) Patent No.: US 6,769,722 B1
(45) Date of Patent: Aug. 3, 2004

(54) TUBE COUPLING DEVICE

(75) Inventor: Michael Krauleidis, Bad Doberan (DE)

(73) Assignee: Selck GmbH & Co. KG, Bargeshagen (DE)

( * ) Notice: Subject to any disclaimer, the term of this patent is extended or adjusted under 35 U.S.C. 154(b) by 0 days.

(21) Appl. No.: 10/149,098

(22) PCT Filed: Nov. 16, 2000

(86) PCT No.: PCT/EP00/11323
§ 371 (c)(1),
(2), (4) Date: Jul. 29, 2002

(87) PCT Pub. No.: WO01/40696
PCT Pub. Date: Jun. 7, 2001

(30) Foreign Application Priority Data

Dec. 2, 1999 (DE) .......................... 199 58 102
Mar. 31, 2000 (DE) .......................... 100 16 312

(51) Int. Cl.[7] .......................... F16L 19/08; F16L 21/00
(52) U.S. Cl. .................. 285/382; 285/382.7; 285/417

(56) References Cited

U.S. PATENT DOCUMENTS

| | | | | |
|---|---|---|---|---|
| 1,281,498 A | * | 10/1918 | Brevig | 285/382.1 |
| 2,507,261 A | * | 5/1950 | Mercier | 285/341 |
| 2,613,959 A | * | 10/1952 | Richardson | 285/341 |
| 3,474,519 A | * | 10/1969 | Hallesy | 29/432 |
| 3,477,750 A | * | 11/1969 | Hann et al. | 285/363 |
| 3,498,648 A | * | 3/1970 | Hallesy | 285/343 |
| 3,765,708 A | * | 10/1973 | Pease et al. | 285/382.2 |
| 3,827,727 A | | 8/1974 | Moebius | |
| 3,843,167 A | * | 10/1974 | Gronstedt | 285/18 |
| 3,893,720 A | | 7/1975 | Moebius | |
| 4,061,367 A | | 12/1977 | Moebius | |
| 4,466,640 A | * | 8/1984 | Van Houtte | 285/104 |
| 4,482,174 A | | 11/1984 | Puri | |
| 4,575,129 A | * | 3/1986 | Porowski | 285/15 |
| 4,598,938 A | * | 7/1986 | Boss et al. | 285/382.2 |
| 4,621,844 A | * | 11/1986 | Kipp et al. | 285/381.3 |
| 5,242,199 A | * | 9/1993 | Hann et al. | 285/148.19 |
| 5,405,176 A | * | 4/1995 | Babel et al. | 285/382 |
| 5,452,921 A | * | 9/1995 | Hyatt et al. | 285/23 |
| 5,823,579 A | * | 10/1998 | Mackay | 285/93 |
| 6,450,553 B1 | * | 9/2002 | Suresh | 285/382 |

FOREIGN PATENT DOCUMENTS

DE 350608 * 3/1922

* cited by examiner

Primary Examiner—James M. Hewitt
(74) Attorney, Agent, or Firm—Jordan and Hamburg LLP

(57) ABSTRACT

A device for producing a pressure-tight pipe coupling with at least one pipe and comprises a bushing-type, rotationally symmetric base body. The base body is provided with at least one essentially cylindrical inner chamber, having toothed elements in order to receive the pipe end. The toothed elements are displaced radially into the pipe end arranged in the inner chamber by means of a pressing device which impinges upon the outer surface of the base body. A pressing device consisting of a shaping ring and a corresponding pair of shaping rings guarantee that the radial displacement potential is realized in the form of a radial displacement, resulting in significantly lower pressing power.

10 Claims, 9 Drawing Sheets

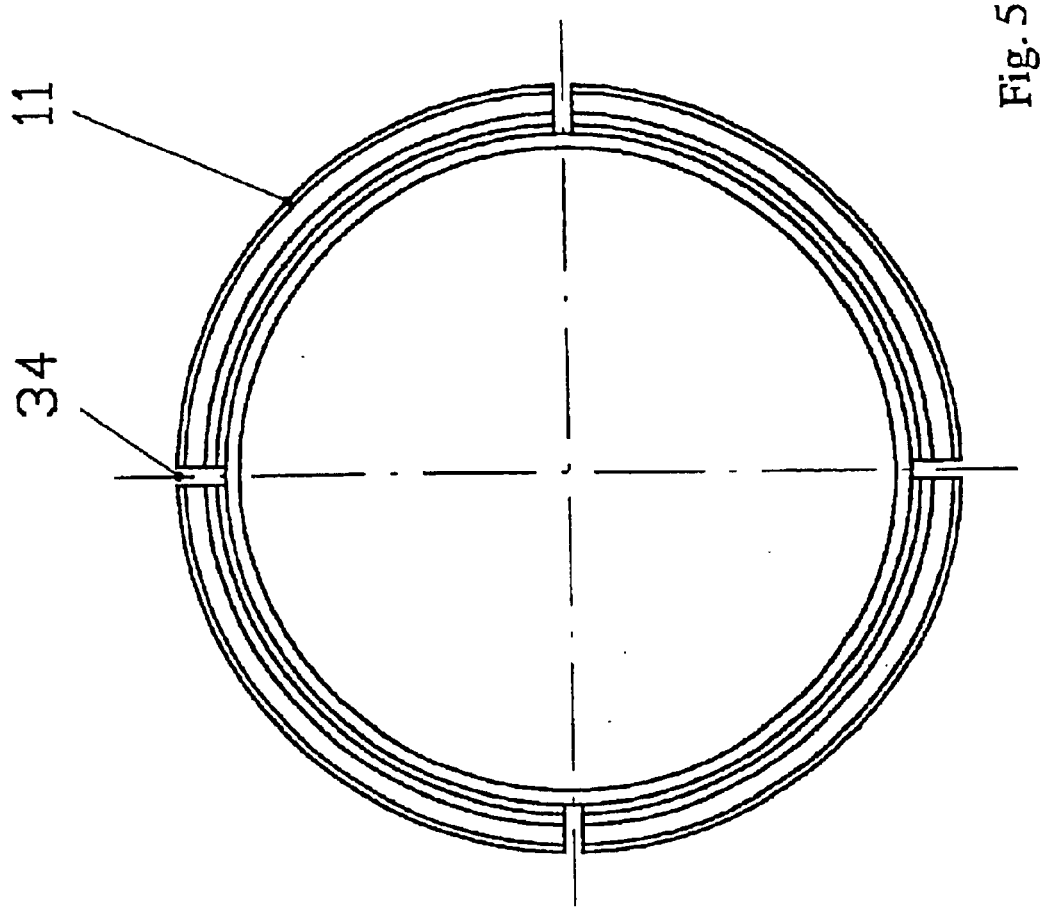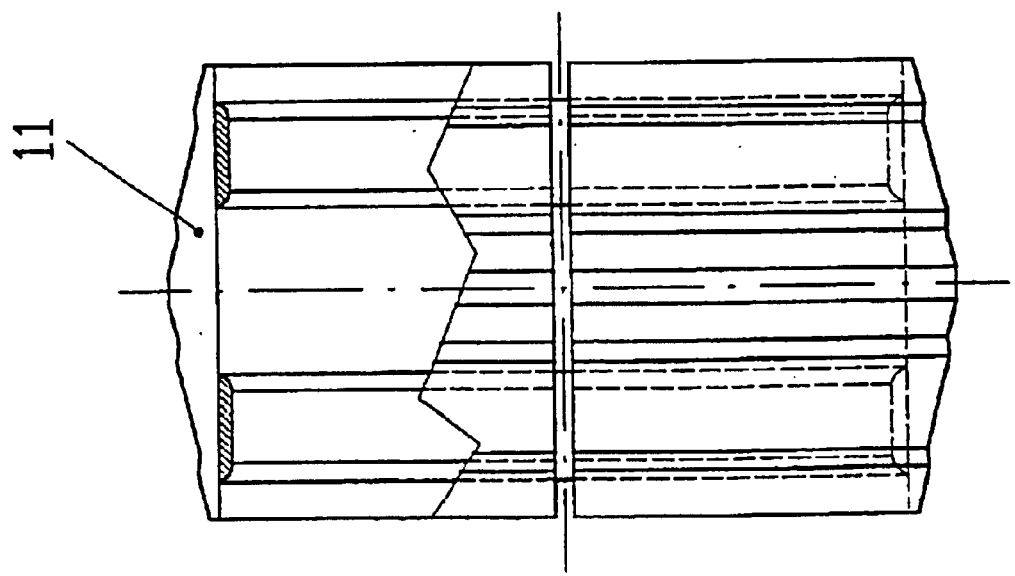
Fig. 5

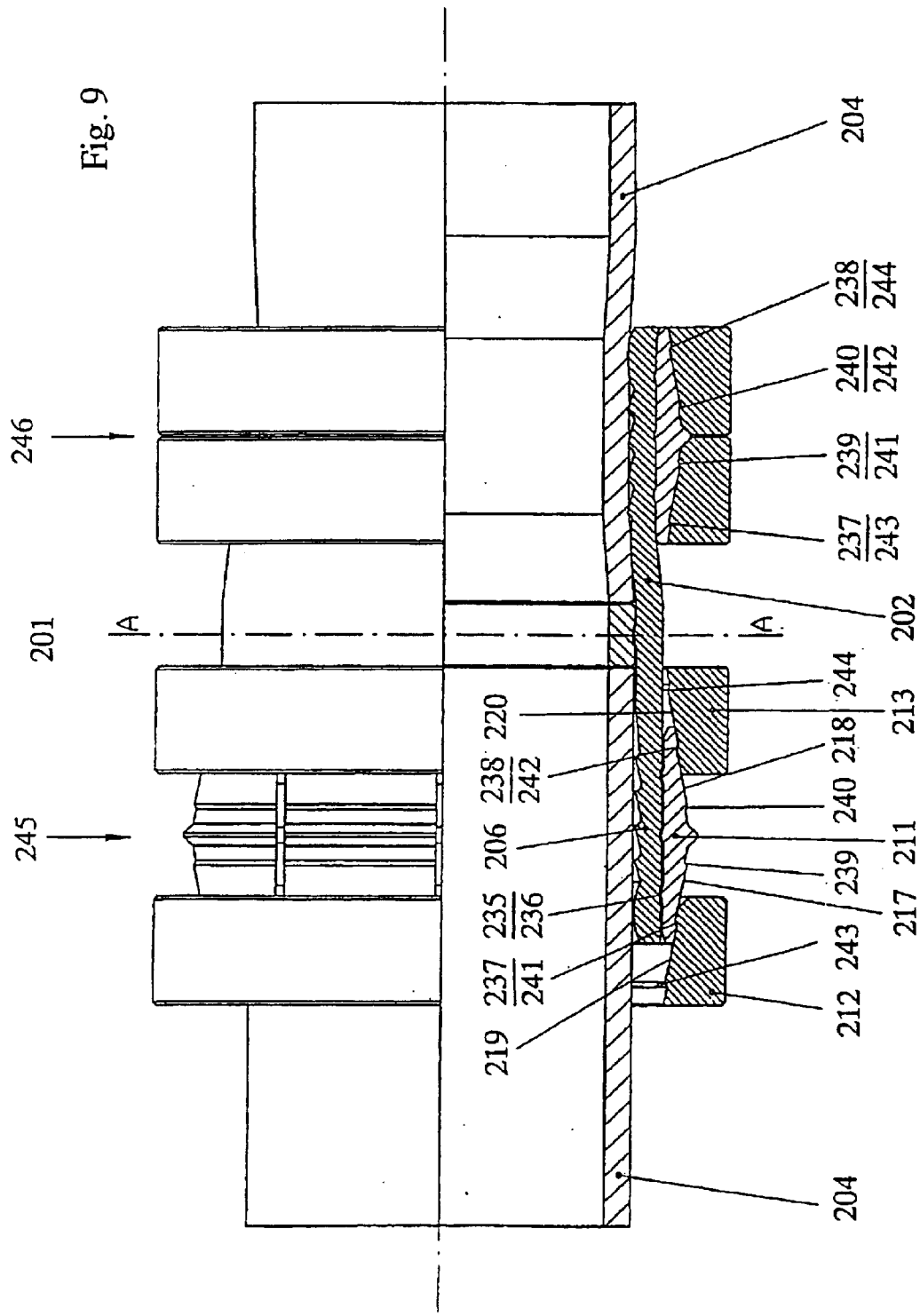

TUBE COUPLING DEVICE

BACKGROUND OF THE INVENTION

The invention relates to a device for manufacturing a tube coupling of two tube ends, and in particular a tube coupling which at least comprises a basic body enclosing the tube end, and a press means enclosing the basic body wherein the basic body is radially urged into the surface of the tube by axially shifting the press means.

Pipe connections using this principle are known from the patent specifications U.S. Pat. Nos. 3,827,727, 3,893,720, 4,026,006, 4,061,367, 4,482,174 and 5,110,163.

The disadvantage of these pipe connections is in that they are functionally restricted in use regarding the size of the tube diameter, claims of quality on the tube to be connected, and the amount of pressure of the medium. Moreover, the constructional design of the displacing potentials formed in these tube couplings provides in addition to the intended radial crowding being absolutely necessary to obtain a pressure sealed connection, an axial crowding which does not contribute to the pressure sealed connection but influences the forces of pressure to be applied from the outside such that the forces of pressure exceed the dimension required for the radial crowding. Thus, from the start follows an oversizing of both the press tool and single elements of the tube coupling.

SUMMARY OF THE INVENTION

The invention is based upon the object to provide a pressure sealed pipe connection by axially pressing which ensures highest universality regarding the requirements of quality of the tubes to be connected.

Another object of the invention is in that to make a sealed connection in the high pressure range as well by the use of normal commercially available tubes, e.g. welded tubes made of most different materials, and the thus permissible tolerances regarding the mechanical properties and length related dimensions.

Further, it is an object of the invention to minimize the forces required for axially pressing on the press elements, and thus the force to be applied for penetrating into the tube surface at maximum penetrating depth.

These objects will be solved by a device according to the features of the first claim.

The device for manufacturing a pressure sealed tube coupling having at least one tube end comprises a sleeve shaped, rotationally symmetrical basic body wherein the basic body at least includes one substantially cylindrical interior space provided with teeth means for receiving the tube end, and the teeth means are radially displaced into the surface of the tube end received by the interior space by means of press means acting upon the outer surface of the basic body.

The basic body comprises a hollow cylinder shaped coupling sleeve having a wall thickness substantially remaining the same wherein at least two radially surrounding indentations are located on the inside of the coupling sleeve which are spaced to one another and recessed in comparison with the inner diameter of the coupling sleeve. On the outside of the coupling sleeve are formed radially surrounding flat locating features opposite the respective indentation which have a width corresponding to the width of the indentation. For it, a pressure ring concentrically slidable over the coupling sleeve is provided to cover the coupling sleeve in almost its total length wherein the pressure ring has radially surrounding projecting parts corresponding to the locating features on its inside, and an increasing cone shaped enlargement directed from each end of the pressure ring towards its centre, on its outside.

A press ring concentrically enclosing the pressure ring is associated to the pressure ring on each side, wherein each press ring on its inside has a cone shaped enlargement corresponding to the cone shaped enlargement of the pressure ring such that a radial displacement of the indentations into the surface of the tube received by the coupling sleeve by means of the projecting parts and the locating features corresponding to the projecting parts occurs during the axial shift of the press rings against each other from a spaced initial position into an almost final position without any distance.

Further features of the invention are cited in the dependent claims.

The invention will be explained in more detail according to an embodiment shown the associated drawings.

BRIEF DESCRIPTION OF THE DRAWINGS

FIG. 5 are two views of a pressure ring segmented by slots;

FIG. 9 is a longitudinal section through the tube coupling according to the invention in another embodiment.

DETAILED DESCRIPTION

Figure 1:
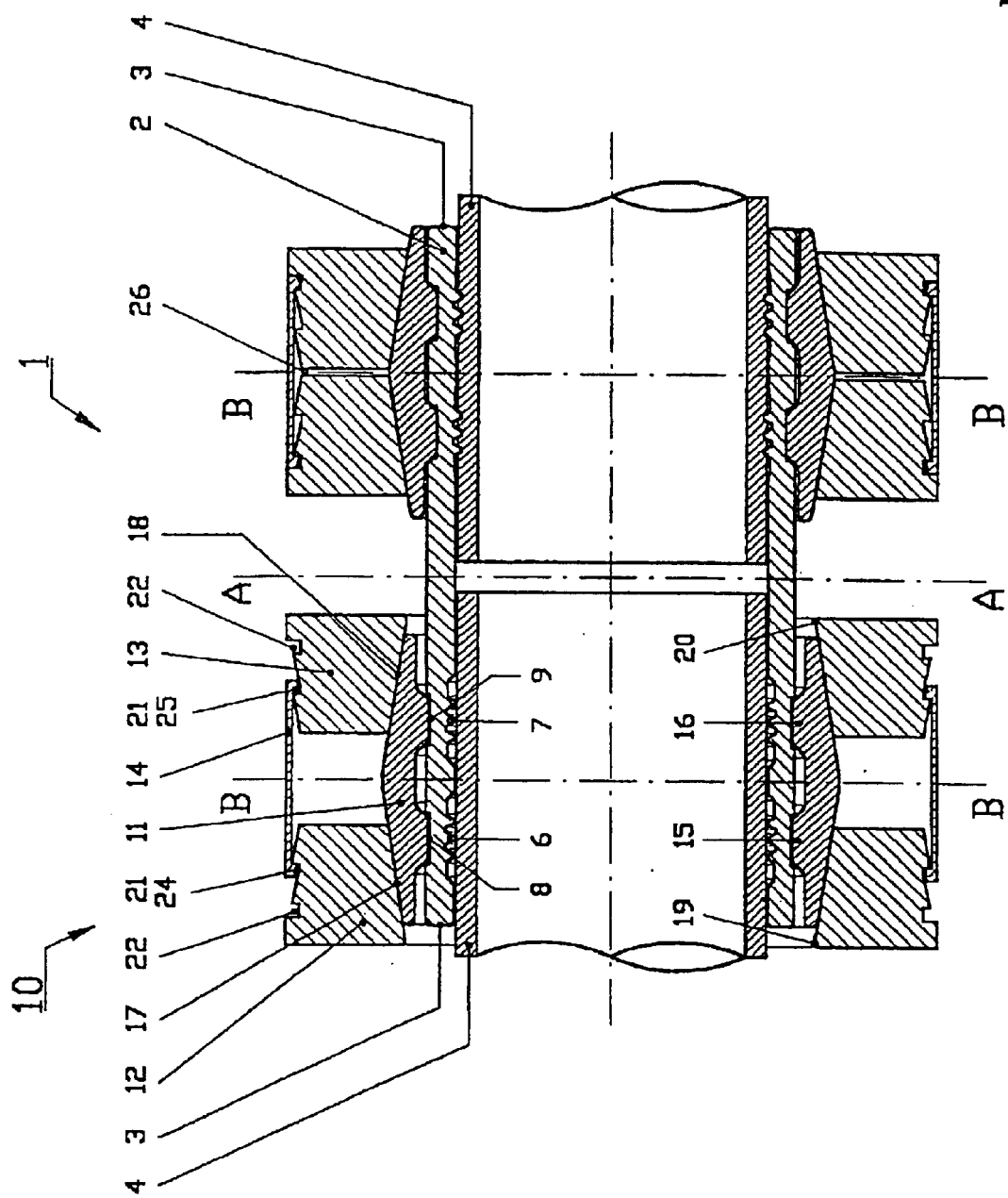
FIG. 1 is a longitudinal section through a tube coupling according to the invention performed on both sides wherein on the left hand of the axis of symmetry A—A a pre-pressed half, and on the right hand of the axis of symmetry A—A a pressed half of the tube coupling are illustrated.

FIG. 1 shows a longitudinal section through a tube coupling 1 according to the invention performed on both sides wherein on the left hand of the axis of symmetry A—A a pre-pressed and on the right hand of the axis of symmetry A—A a pressed half of the tube coupling 1 are illustrated.

The tube coupling 1 comprises a hollow cylinder shaped coupling sleeve 2 having axially opposite entering ends 3 into which the ends of the tubes 4 to be connected are inserted. The tube coupling 1 is constructed symmetrically with respect to the axis A—A, that is the subsequently described coupling elements and acting relations always relate to one half of the coupling sleeve 2. In the present embodiment in which two tubes 4 having the same diameter are to be connected in a pressure sealed manner the constructional formation of the coupling elements on the one half of the coupling sleeve 2 is in symmetry to the axis A—A with that of the other half of the sleeve. Therefore, in the present case the structure and action of the tube coupling 1 will be described for one side only.

The coupling sleeve 2 is generally fabricated from a material which is identical with the material of the tubes 4.

The coupling sleeve 2 is a hollow cylinder the wall thickness of which substantially remains constant over the length of the coupling sleeve 2, and which is in relation to the outer diameter of the tube 4 and the wall thickness thereof.

The inside of the coupling sleeve 2 comprises radially surrounding indentations wherein one indentation 6 is located spaced in the proximity of the entering end 3 of the coupling sleeve 2, and the second indentation 7 is located spaced to the first indentation 6 towards the axis A—A. In the present embodiment, the indentation 6, 7 comprises three juxtaposed teeth which are recessed in comparison with the inner diameter of the coupling sleeve 2 in the way such that the diameter measured in the area of the tooth tips equals the inner diameter or is greater than the inner diameter of the coupling sleeve 2. As a result, it is avoided that the tooth tips are damaged with inserting the tube 4 into the interior space of the coupling sleeve 2.

The tooth tips of the indentations 6, 7 are allowed to be differently formed according to the case of application. Thus, it is conceivable to flatten or round the tooth tip in order to thus influence the penetrating behavior of the indentation 6, 7 into the surface of the tube 4. On the outside of the coupling sleeve 2 there are located locating features which represent as radially surrounding, flat grooves 8, 9 opposite the respective indentations 6, 7. The function of these grooves 8, 9 will be dealt with in a later connection.

In a particular case of application, in the area of the axis of symmetry A—A, thus in the area wherein in the coupling position the ends of the tubes 4 are oppositely located the coupling sleeve 2 can be realized with an inner stepped neck portion which causes limiting the inserting depth of the inserted tube 4. When the coupling sleeve 2 is not necked inside as in the present embodiment, thus it can be used as a shifting sleeve.

On the coupling sleeve 2 is located a pressing set 10 coaxially located therewith which comprises a pressure ring 11, two press rings 12, 13 and a covering sleeve 14 as the case may be.

The pressure ring 11 is a rotationally symmetrical hollow cylinder which on the inside comprises locating features for fixing on the coupling sleeve 2. These locating features represent radially surrounding projecting parts 15, 16 which are realized such that they correspond to the grooves 8, 9 on the outside of the coupling sleeve 2. The axial position of the pressure ring 11 on the coupling sleeve 2 will be defined by the respective combination of the groove 8, 9/projecting part 15, 16. The diameters of the groove basic, on the one hand, and of the projecting part, on the other hand, will be selected such that between the two structural members a pre-pressed condition realized by means of a clearance fit is obtained which facilitates an assembly of the tube coupling 1.

On the top surface of the pressure ring 11 are located cone shaped enlargements 17, 18 originating from the ends of the pressure ring 11 which increase evenly and continuously up to the axis of symmetry B—B.

Each cone shaped enlargement 17, 18 of the pressure ring 11 is associated to a press ring 12, 13. The press rings 12, 13 represent rotationally symmetrical hollow cylinders which on their inside comprise a cone shaped enlargement 19, 20 directed towards the axis of symmetry B—B. This cone shaped enlargement 19, 20 of the press ring 12, 13 corresponds to the associated cone shaped enlargement 17, 18 of the pressure ring 11 by contacting the two structural members on the cone shaped surfaces.

In the pre-pressed condition of the tube coupling 1 the press rings 12, 13 are pushed on the respective enlargement 17, 18 of the pressure ring 11 so far that there is a sufficient distance between the press rings 12, 13 opposing each other which is measured, such that during carrying out the pressing action an axial motion of the press rings 12, 13 will be permitted to each other.

The top surface of each press ring 12, 13 comprises a pair of radially surrounding spaced grooves 21, 22 which receive a covering sleeve 14 acting as retaining element. The covering sleeve 14 comprises on its borders inwardly facing edges 24, 25 which will be engaged with the circumferential grooves 21, 22. On that occasion, in the pre-pressed condition of the tube coupling 1, the edges 24, 25 are engaged with the groove 21 nearest the axis of symmetry B—B, respectively, wherein in the pressed condition of the tube coupling 1, the engagement of the edges 24, 25 merges to the adjacent grooves 22. To facilitate this transition during the axial motion of the press rings 12, 13 to each other both the edges 24, 25 and the grooves 21, 22 comprise run-out bevels.

The covering sleeve 14 with the pre-pressed tube coupling 1 accomplishes the function to keep the individual elements of the press set 10 together in a condition in which they are capable of being assembled.

With the pressed tube connection 1 the object of the covering sleeve 14 is in that to actively oppose an unintentionally loosening of both press rings 12, 13, and moreover to avoid soiling of the space 26 located between the press rings 12, 13.

In the following, the action of producing the pressure sealed tube coupling 1 will be described. A press set 10 including a pressure ring 11 a pair of press rings 12, 13 and the covering sleeve 14 is pushed on the coupling sleeve 2. On that occasion, the inwardly facing projecting parts 15, 16 of the pressure ring 11 lock into the respective groove 21, 22 located on the outside of the coupling sleeve 2 thus defining the place of the pressing set 10 on the coupling sleeve 2. This assembly is allowed to be prefabricated and delivered to the assembly yard depending on the nominal width of the tubes 4 to be connected. On the assembly yard, the ends of the tubes 4 to be connected are inserted with a predetermined length into the coupling sleeve 2. By means of suitable tools which are known per se and thus are not described, the press rings 12, 13 associated to a pair are axially shifted against each other. Then, the press rings 12, 13 slide over the cone shaped surfaces between the press ring 12, 13 and the pressure ring 11 and displace the material of the pressure ring 11 in the radial direction. The displacement primarily occurs through the projecting parts 15, 16 of the pressure ring 11 and is transferred to the indentations 6, 7 opposite the grooves 8, 9. The indentations 6, 7 are radially urged into the surface of the inserted tubes 4 and ensure in this way a pressure sealed connection between the coupling sleeve 2 and the tube 4.

Both, the axial force to be applied and the penetrating depth and supporting force as well of the circumferential indentation 6, 7 of the coupling sleeve 2 in the tube 4 to be connected can be influenced through the angle of the cone shaped enlargements of the press rings 12, 13 and the pressure ring 11, and the path as well travelled during axially pushing together.

Figure 2:
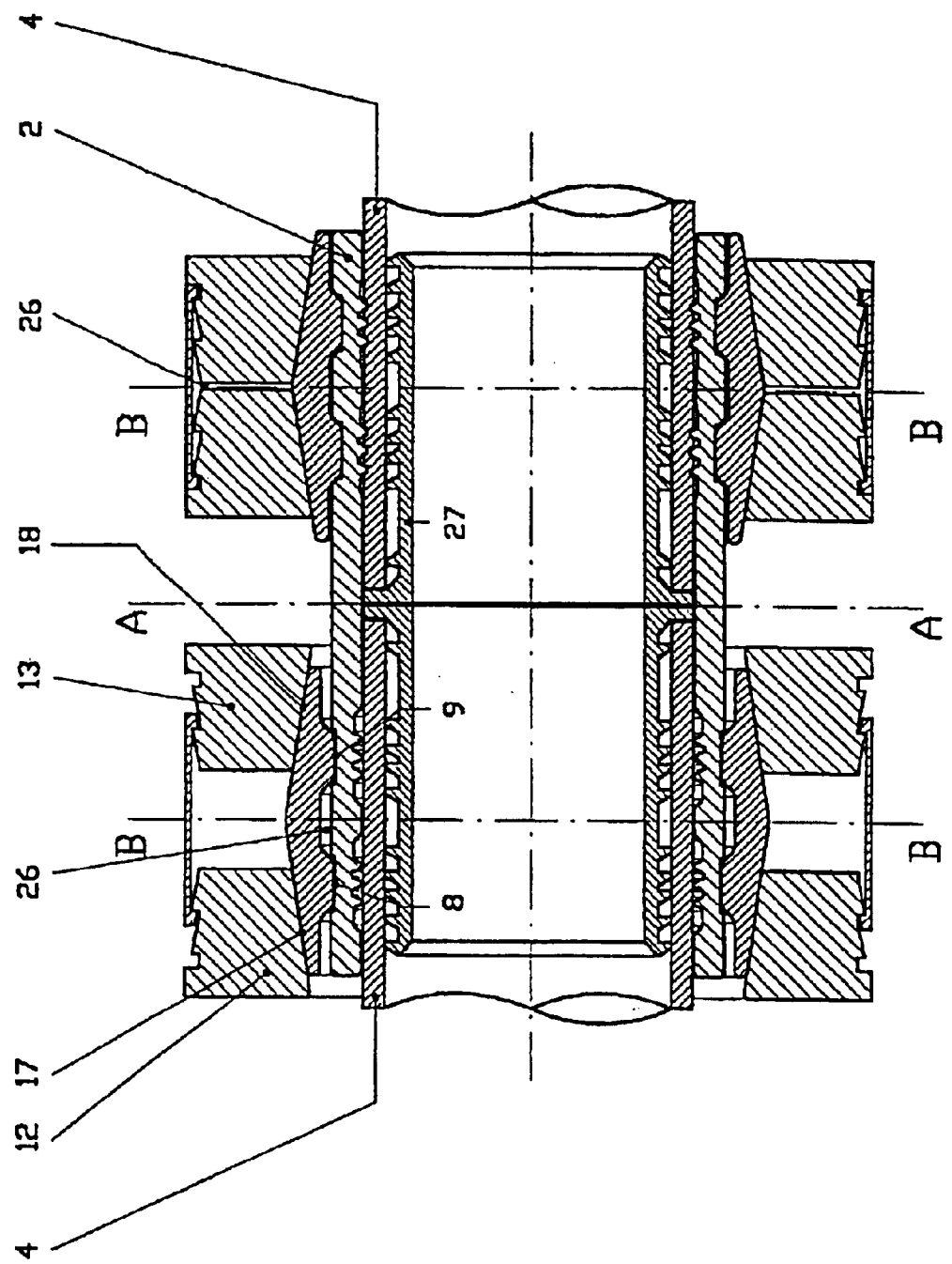
FIG. 2 is a longitudinal section through the tube coupling according to FIG. 1 having an inserted supporting sleeve.

In FIG. 2 is shown the same tube coupling 1 as described in FIG. 1. The difference is in that a supporting sleeve 27 will be inserted into the tube 4, which in the area of the displacement provides for the tube 4 a resistance supporting the penetration of indentation 6, 7 into the surface of the tube 4. The supporting sleeve 27 comprises radially surrounding asperities on its outer surface which balance the tolerances of the tube 4 during inserting it into the supporting sleeve 27.

Figure 3:
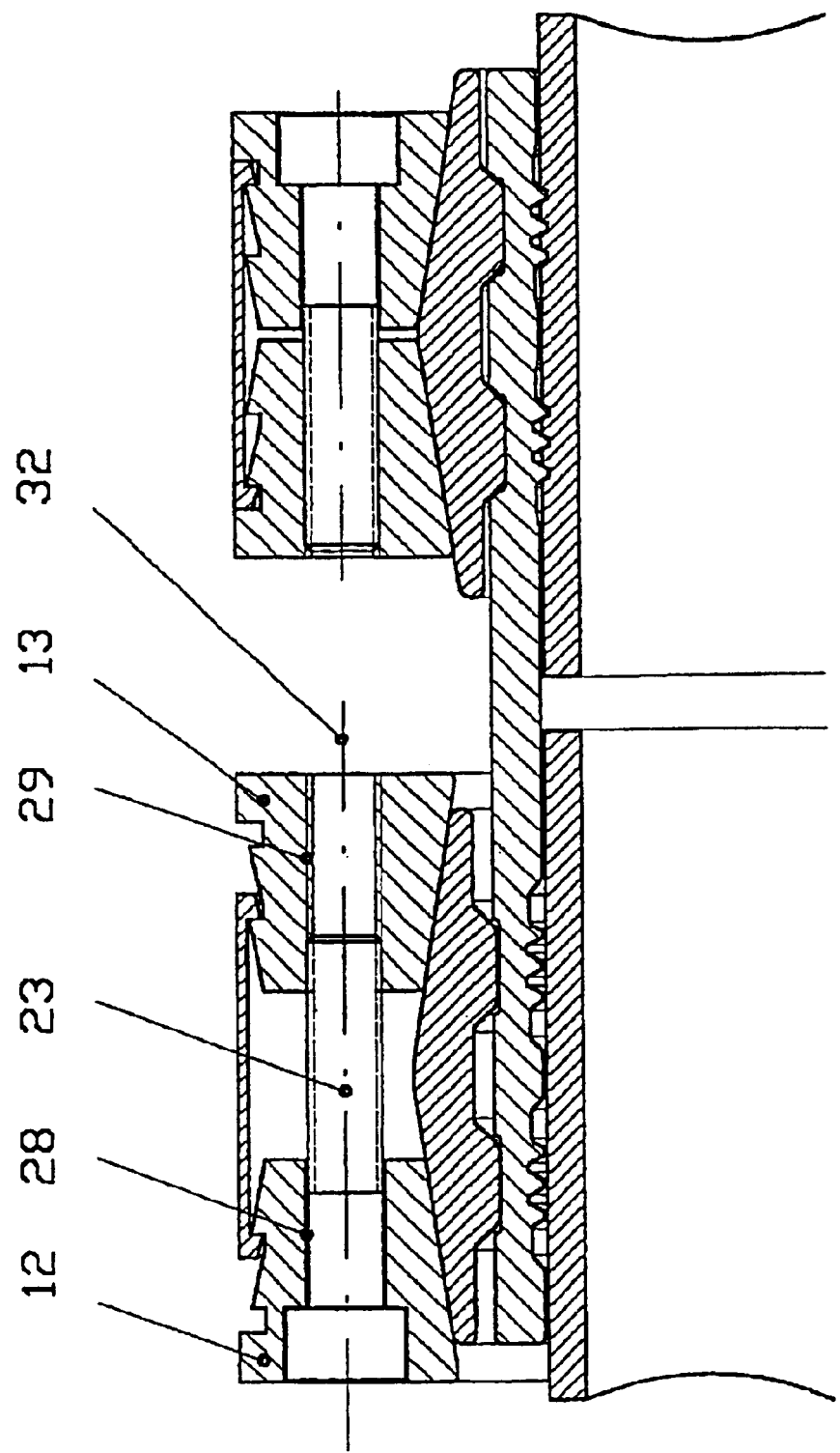
FIG. 3 is a longitudinal section through the upper half of the tube coupling according to FIG. 1 wherein the opposite press rings are shifted against each other by screws.

In FIG. 3 applying the axial shifting force upon the press rings 12, 13 by means of screws is shown. The press rings 12, 13 comprise bores axially located on a graduated circle 32 wherein the bore located within the press ring 12 is formed as a through hole 28, and the bore axially opposite inside the press ring 13 is formed as a threaded hole 29. Due to uniformly pulling the screws 23 the press rings 12, 13 are displaced against each other on the cone shaped surfaces.

Figure 4:
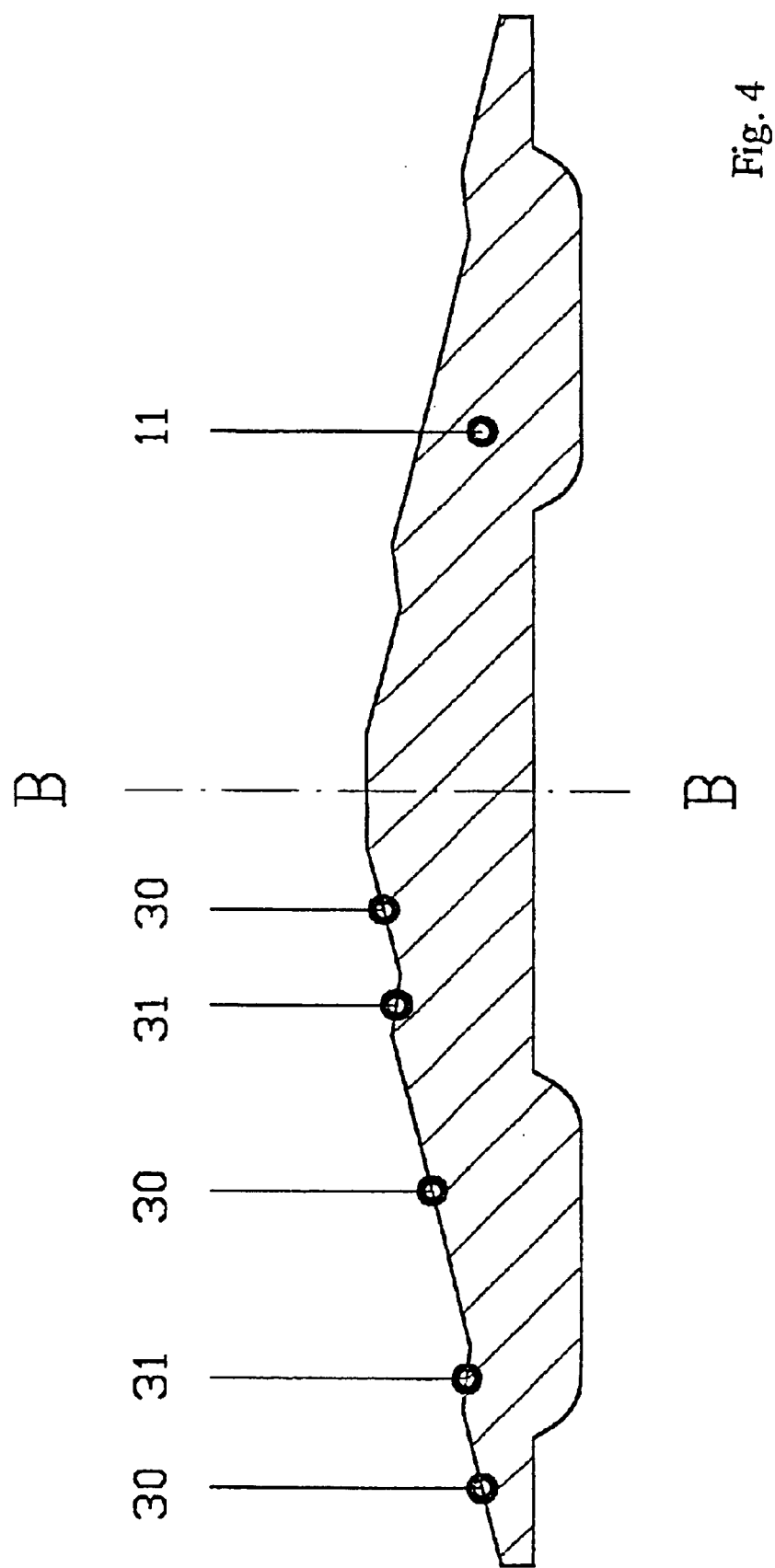
FIG. 4 is a longitudinal section through the upper half of a pressure ring having a stepped cone shaped formation of the surface.

As shown in FIG. 4 the top surface of the pressure ring 11 can be realized in a stepped way up to the axis of symmetry B—B wherein a conically increasing, plane formed section 30 is followed by an undercut section 31 which is formed as a cone shaped neck. This sequence repeats preferably four times up to the axis of symmetry B—B. These undercut sections 31 prevent mutually sliding in the pre-pressed and finish-pressed condition, respectively, with a complementary formation of the inside of the press rings 12, 13.

In FIG. 5 the pressure ring 11 is shown in a partly segmented formation. The body of the pressure ring 11 is slotted except from the radially surrounding projecting parts 15 and 16. As a result, the required axial forces of pressure are minimized with steady properties of the pressing set 10 and the radial displacement. The number and the width of the slots 34 are in a direct combination with the radial shortening of the pressure ring 11.

In a modified form the pressure ring 11 can also be composed of single arcuate segments.

Figure 6:
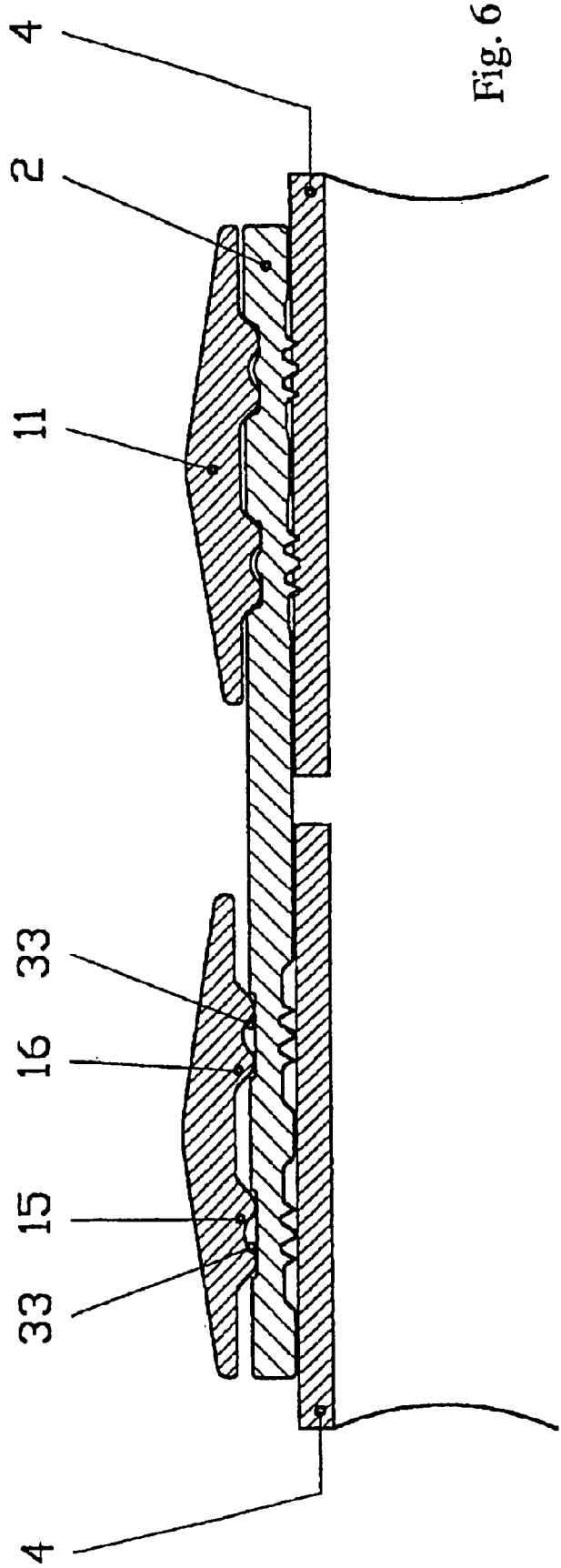
FIG. 6 is a longitudinal section through the upper half of another embodiment of the tube connection.

The form of the fixing area between the pressure ring 11 and the coupling sleeve 2 shown in FIG. 6 is allowed to be further modified. Thus, for example it is possible for the fixing area on the coupling sleeve 2 to be carried out in circumferential way. The circumferential ring grooves 33 serve as a balancing area for stresses in the structural members of the coupling becoming too strong which occur with pressing the tubes having a great range of tolerance when the tolerance of the outer tube diameter is in the upper limit range.

The forms of the bottom side of the pressure ring 11 shown in the embodiments are allowed to be further modified without thus being departed from the scope of protection of the patent.

Figure 7:
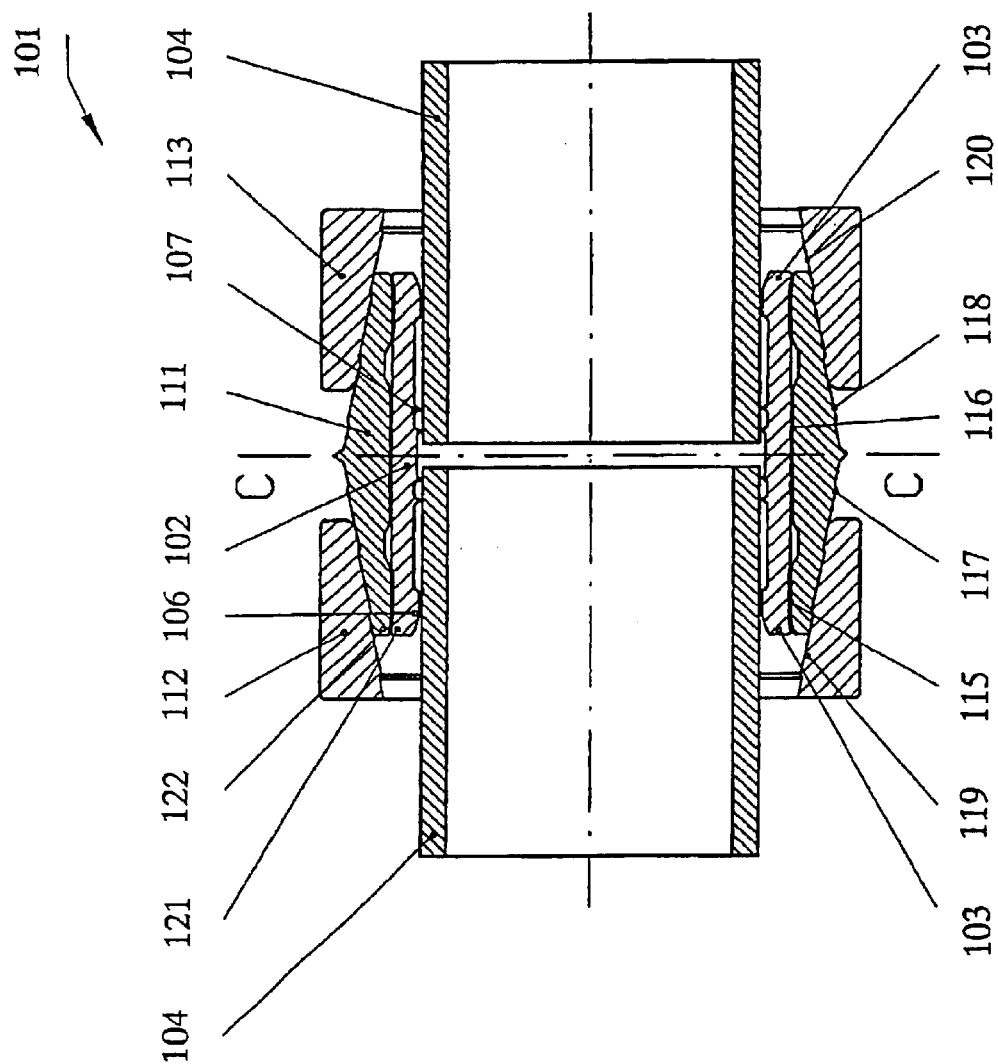
FIG. 7 is a longitudinal section through a tube coupling according to the invention in another embodiment which is performed on both sides.

The tube coupling will be described in another embodiment. The tube coupling 101 according to FIG. 7 comprises a hollow cylinder shaped coupling sleeve 102 having axially opposite entering ends 103 into which the ends of the tubes 104 to be connected are pushed in up to the axis of symmetry C—C.

The inside of the coupling sleeve 102 comprises radially surrounding indentations wherein one indentation 106 is located spaced in the proximity of the entering end 103 of the coupling sleeve 102, and the second indentation 107 is located spaced towards the first indentation 106 in the direction of the axis C—C in the proximity of the tube end pushed in. Therefore, the ends of the tubes 104 will be positioned in the coupling sleeve 102 such that each tube end is associated to both an indentation 106 and indentation 107.

On the coupling sleeve 102 is located a press set 110 coaxially mounted thereto which comprises the pressure ring 111, and two press rings 112, 113.

The pressure ring 111 is a rotationally symmetrical, hollow cylinder being substantially of the same length with the coupling sleeve 102. The pressure ring 111 and the coupling sleeve 102 comprise on their ends axially effecting locating features which represent on the coupling sleeve 102 as a flat circumferential swelling 121 and on the pressure ring 111 as a flat groove 122 corresponding to the swelling 121. These locating features define the axial position of the pressure ring 111 on the coupling sleeve 102, and ensure in the pre-pressed condition an interlocking connection between the coupling sleeve, on the one hand, and the pressure ring, on the other hand. A high degree of prefabrication of the tube coupling is obtained by means of this cohesion of the single elements of the assembly.

On the top surface of the pressure ring 111 are located cone shaped enlargements 117, 118 originating from the ends of the pressure ring 111 which increase continuously and evenly up to the axis of symmetry C—C. A press ring 112, 113 is associated to each cone shaped enlargement 117, 118 of the pressing ring 111. The press rings 112, 113 represent as rotationally symmetrical hollow cylinders which comprise a cone shaped enlargement 119, 120 directed towards the axis of symmetry C—C on its inside. These cone shaped enlargements 119, 120 of the press rings 112, 113 correspond to the associated cone shaped enlargements 117, 118 of the press rings 111 by contacting the two structural members each other on the cone shaped surfaces.

In the pre-pressed condition of the tube coupling 101 the press rings 112, 113 are pushed on the respective enlargement 117, 118 of the pressure ring 111 so far that between the opposite press rings 112, 113 a sufficient distance exists which is dimensioned such that an axial motion of the press rings 112, 113 to each other will be permitted during carrying out the pressing action.

The process of fabrication of the pressure sealed tube coupling 101 will be described below. A press set comprising the pressure ring 111 and a pair of press rings 112, 113 is pushed on the coupling sleeve 102. According to the nominal width of the tubes 104 to be connected this assembly can be prefabricated and delivered to the assembly yard. On the assembly yard the ends of the tubes 104 to be connected are inserted with a predetermined length into the coupling sleeve 102 up to the axis of symmetry C—C. By means of suitable tools which are known per se and thus are not described the press rings 112, 113 associated to one pair are axially displaced against each other. On that occasion, the press rings 112, 113 slide over the cone shaped surfaces between the press ring 112, 113 and the pressure ring 111, and displace the material of the pressure ring 111 in the radial direction. The displacement primarily occurs through the projecting parts 115, 116 of the pressure ring 111, and will be transferred to the indentations 106, 107 opposite the projecting parts 115, 116. The indentations 106, 107 are radially urged into the surface of the inserted tubes 104, and ensure this way a pressure sealed connection between the coupling sleeve 102 and tube 104. In this particular embodiment as well the cone shaped enlargements 117, 118 of the pressure ring 111 are designed in a stepped way. This means, that originating from the end of the pressure ring 111 a greater area of the cone shaped enlargement is followed by a cone shaped neck of less extent. This stepped formation repeats up to the axis of symmetry over the total cone shaped enlargement 117, 118. Accordingly, the cone shaped enlargements 119, 120 of the press rings 112, 113 are complimentarily formed.

The functional effects of this stepped formation of the opposite surfaces are of importance in two respects. In the pre-pressed condition, the interlocking engagement between the pressure ring 111, on the one hand, and the press rings 112, 113, on the other hand, ensure a cohesion of the individual elements of the assembly, and thus a high degree of pre-fabrication of the tube coupling. In the pressed condition, the same formation ensures to avoid the press rings from sliding back from the pressure ring. Thus, the safety of the tube connection will be increased with most different loads.

Figure 8:
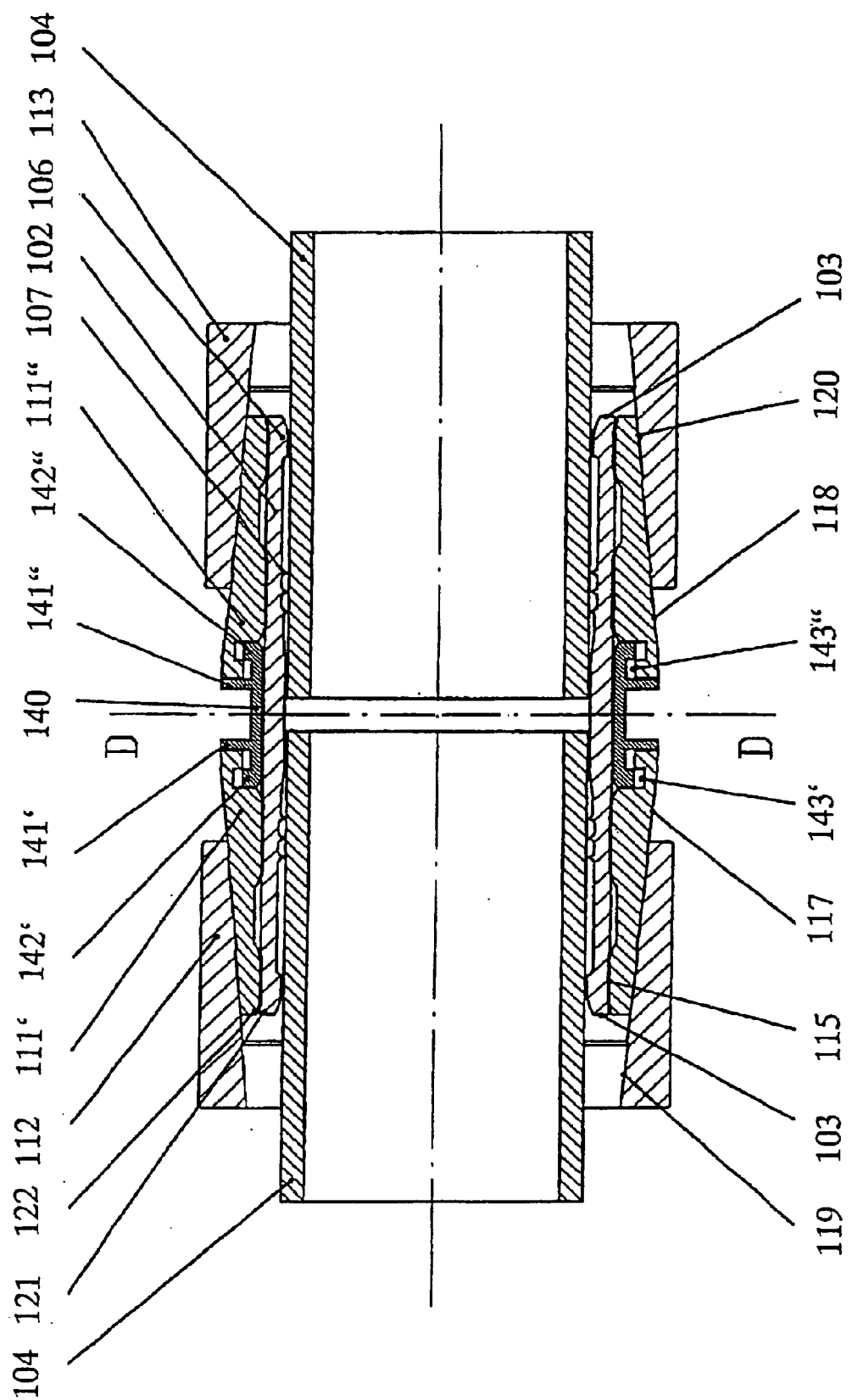
FIG. 8 is a longitudinal section through a tube coupling according to FIG. 7 in which the pressure ring is divided.

In an embodiment formed as shown in FIG. 8 the pressure ring 111 is divided in its radial axis of symmetry D—D into the pressure ring portions 111' and 111". Both pressure ring portions 111' and 111" are coupled with each other by an axial intermediate ring 140. Then, the intermediate ring 140 has the same inner diameter as the pressure ring portions 111' and 111" in order to push the pressure ring assembly formed of the pressure ring portions 111' and 111" and the intermediate ring 140 over the coupling sleeve 102 having the same length.

The intermediate ring 140 comprises two spaced surrounding flanges 141' and 141" on its outside which serve as a stop for the face directed towards the axis of symmetry D—D of the respective pressure ring portion 111', 111". Moreover, the intermediate ring 140 comprises each an area from the outside directed from the flange 141', 141", respectively, which terminates in an from the outside facing edge 142', 142". The end of the pressure ring portion 111', 111" associated to the edge 142', 142" comprises an area with a diameter which is increased in comparison with the inner diameter, in which a groove 143', 143" is machined which will be engaged with the edge 142', 142". This engagement ensures a pre-mounting state of the two pressure ring portions 111', 111".

The space located between the flanges 141', 141" serves for receiving a pressing tool not shown wherein the pressing tool supports on the flange, on the one hand, and on the outwardly directed face of the associated press ring. The advantage of this modification is in the diminution of the pressing path, and thus of extensive minimization of the pressing tool. The invention will be described according to another embodiment. In this embodiment, the device serves for the pressure sealed connection of two opposite tube ends of the same nominal width in alignment. The tube coupling 201 performed as shown in FIG. 9 restricts to the one side of the device since it is provided symmetrically to the axis A—A.

The tube end 204 will be pushed in from one side into the hollow cylinder shaped coupling sleeve 202 approximately up to its centre. The inner area of the coupling sleeve 202 is provided in the section receiving the tube end 204 with a plurality of radially surrounding teeth 206 being spaced to one another and recessed in comparison with the inner diameter of the coupling sleeve 202 which are directed against the surface of the tube end 204.

Over this section of the coupling sleeve 202 is pushed a pressure ring 211 the inner diameter of which is slightly greater than the outer diameter of the coupling sleeve 202. On its outside the pressure ring 211 comprises a cone shaped enlargement 217, 218 originating from each end and increasing to the centre of the pressure ring 211.

The pressure ring 211 is associated on each side with a press ring 212, 213. Each press ring 212, 213 is realized on its inside with a cone shaped enlargement 219, 220 which correspond to the cone shaped enlargements 217, 218. In the not pressed position of the device which is characterized with the reference numeral 245 the press rings 212, 213 are pushed over the respective end area of the pressure ring 211 wherein the cone shaped enlargements (217/219, 218/220) are adjacent in these areas.

From the position 245 the press rings 212, 213 are shifted against each other over the cone shaped enlargements into the pressed position of the device as illustrated at 246 by means of a tool being not shown. On that occasion, the pressure ring 211 is radially urged into the coupling sleeve 202 which in turn results in a radial displacement of the teeth 206 into the surface of the tube end 204. In this way, a pressure sealed, non-detachable tube coupling is formed.

A considerable feature of the invention is in that to pre-assemble the single elements of the tube coupling such as the coupling sleeve 202, pressure ring 211 and press rings 212, 213 in order to provide them as a compact assembly on the assembly yard. With this, it is necessary for the single elements to be equipped with means which enables a defined positioning of the single elements to one another.

For this reason, the coupling sleeve 202 is formed with radially surrounding grooves 235 on the outside of the section which receives the tube end 204. The pressure ring 211 on its inside comprises radially surrounding locating features formed as swellings and corresponding to the grooves 235. The tolerance between the two elements is formed such that with pushing on the pressure ring 212 on the coupling sleeve 202 by means of manual force, the swellings 236 lock into the grooves 235, and fix the position of the two elements to one another in the pre-pressed condition.

In a similar way, the pressure ring 211 on its outside and the press rings 212, 213 on its inside are equipped with respective means for positioning to one another.

The pressure ring 211 is equipped with a locating feature 237, 238 on its cone shaped enlargement 217, 218 in the proximity of its end, respectively, and with another locating feature 239, 240 in the proximity of its centre, and the respective press ring 212, 213 is provided with a locating feature 241, 242 on its end facing towards the pressure ring 211 on its cone shaped enlargement 219, 220 formed on the inside, and with another locating feature 243, 244 on the end facing off the pressure ring 211.

The locating features correspond to each other in a different way according to the condition of the tube coupling 201. In the not pressed condition of the tube coupling 201 the locating features 237, 238 formed on the pressure ring 211 correspond to the locating features 241, 242 of the press rings 212, 213. As a result, all elements of the tube coupling 201 are assembled to a structural unit factory sided which in this compactness can be provided on the assembly yard.

With pressing the tube coupling 201 the engagement of the locating features acting between the pressure ring 211 and the press rings 212, 213 will be changed such that, on the one hand, the locating features 239 and 240 of the pressure ring 211 come into active relation with the locating features 241, 242 of the press ring 212, 213, and on the other hand, the locating features 237 and 238 of the pressure ring 211 come into active relation with the locating features 243, 244 of the press ring 212, 213. In this way, the press rings 212, 213 will be prevented from sliding back over the cone shaped formations after pressing and thus endangering the stability under load of the tube coupling 201.

Another feature of the invention is the construction of the pressure ring 211. The pressure ring 211 in its cross-section consists of single segments spaced to one another which uniformly enclose the coupling sleeve 202. For it, the pressure ring 211 will be circumferentially slotted over its total wall thickness in the axial direction wherein preferably between the adjacent segments ridges are left which obtain the shape of the pressure ring 211. The advantage of this construction is in that with pressing the tube coupling 201, the work of deformation between the pressure ring 211 and the press rings 212, 213 will be minimized since the intended and required diminution of the diameter of the pressure ring 211 is firstly realized through closing the slots between adjacent segments, and not through a deformation of the pressure ring 211. The diameter reduction of the pressure ring 211 by shifting the press rings 212, 213 against each other transfers to the section of the coupling sleeve 202 which has received the tube end 204 wherein the teeth 206 are urged into the surface of the tube end 204, and thus ensuring a pressure sealed tube coupling 201.

Another possibility of spacing the individual segments of the pressure ring 211 to one another in a defined way is in depositing a flexible distance mass between the segments which maintains a uniform distribution of the segments on the circumference of the pressure ring 211. During pressing the tube coupling the distance mass between the adjacent segments will be pressed out.

The invention provides a tube coupling which ensures highest universality regarding the requirements to the quality of the tubes to be connected. It comprises a calculable behavior and is capable to ensure high pressure sealed tube couplings planewith great tolerances of outer tube diameters.

The solution according to the invention minimizes the forces required for axially pressing the press rings on the pressure ring and thus on the coupling sleeve. It is distinguished by a high stability in comparison with vibrations, axial tensile forces on the tube and extreme fluctuations of temperature.

The tube coupling comprises rotationally symmetrical components to be simply manufactured which enable optimum combinations with regard to the aspired properties of the tube coupling with regard to the functional selection of the employed materials having their specific properties.

The solution according to the invention enables the standardization of the design of the press set.

In connection with different coupling sleeves and embodiments, respectively, one and the same design of press set can be used. Thus, it is also possible to press different outer tube diameters only by constructive adaptation of the coupling sleeve in particular limits.

Although the present invention has been described according to some preferred embodiments which show the connection of two tube ends it will be readily appreciated for one skilled in the art that various modifications and changes can be made without departing from the scope of protection of the following claims. Thus, it can be seen that it is fallen back on the pressing connection carried out according to the invention on one side only, however, the other side is equipped with conventional connecting elements such as, e.g. threaded joints or flanges which merely represents a special embodiment of the invention.

What is claimed is:

1. A device for providing a pressure sealed coupling of tube ends of two tubes, comprising:

a cylinder-shaped coupling sleeve having a sleeve interior surface defining a substantially cylindrical interior space, said sleeve interior surface being equipped with teeth means for receiving each of the tube ends, said teeth means being radially displaceable into surfaces of said tube ends received by the interior space by pressure acting on an outer surface of said coupling sleeve;

said sleeve interior surface defining at least two radially surrounding indentations spaced from one another and recessed with respect to an inner diameter of said coupling sleeve and having said teeth means disposed therein for engaging respective ends of said two tubes;

said outer surface of said coupling sleeve defining radially surrounding locating features which have a width corresponding to a width of said indentations and are opposite said respective indentations;

pressure rings concentrically slidable over said coupling sleeve for covering said coupling sleeve, said pressure rings each having an inner surface having radially surrounding projecting parts aligned with said locating features and an increasing cone-shaped enlargement of an outer surface thereof which is directed from each end of the pressure rings towards a center thereof; and press rings concentrically enclosing each of said pressure rings on each side, said press rings each having a cone-shaped enlargement corresponding to said cone-shaped enlargement of said pressure rings such that during axial shifting of said press rings toward each other from a spaced initial position into an almost final position with said press rings at least almost in mutual contact, a radial displacement of said indentations occurs pressing said teeth means into said outer surfaces of said tube ends received by said coupling sleeve by means of said projecting parts and said locating features corresponding to said projecting parts.

2. A device according to claim 1, wherein top surfaces of said press rings are stepped up, the stepping comprising at least one sequence of a conically increasing section plane followed by an undercut section comprising a cone-shaped neck, and the inside surfaces of said press rings are formed complimentarily to corresponding areas of said pressure rings.

3. A device according to claim 1, wherein:

pairs of said press rings each further include a cylindrical covering sleeve spanning a space between said press rinds and having inwardly facing edges at end borders thereof, a top surface of each of said press rings is formed with a pair of radially surrounding, spaced grooves for receiving said inwardly facing edges which are engageable with the surrounding, spaced grooves such that said edges engage in a pre-pressed condition of said device with a first of said annular, spaced grooves, and in the pressed condition of said device said edges engage in a second of said annular, spaced grooves, and wherein both said edges and said annular, spaced grooves include run-out bevels.

4. A device according to claim 1, wherein a radially surrounding flute is formed in said projecting parts for the formation of a balancing area.

5. A device according to claim 1, wherein said press rings comprise axially extending bores for receiving tension elements acting between said press rings which are located on a common graduated circle.

6. A device according to claim 5, wherein said bore in a first of said press rings is formed as a through hole, and said bore in a second of said press rings is formed as a threaded hole for receiving a screw.

7. A device according to claim 1, wherein each of said pressure rings comprises a plurality of segments.

8. A device according to claim 7, wherein each of said pressure rings is provided on a top surface with axially extending slots.

9. A device according to claim 7, wherein a flexible distance mass maintaining a symmetrical distribution of said segments on a circumference of each of said pressure rings is disposed between said segments.

10. A device according to claim 1, wherein a supporting sleeve is insertable into the end of a said tube, said supporting sleeve comprising on its outside radially surrounding asperities to compensate for substantial tolerances in the nominal width of said tube, and said supporting sleeve on one side comprising a flange which limits inserting said supporting sleeve into said tube.

\* \* \* \* \*